US008051177B1

(12) United States Patent
Mitchell et al.

(10) Patent No.: US 8,051,177 B1
(45) Date of Patent: Nov. 1, 2011

(54) MEDIA PROXY HAVING INTERFACE TO MULTIPLE VIRTUAL PRIVATE NETWORKS

(75) Inventors: Julian Mitchell, Maidenhead (GB); Dany Sylvain, Gatineau (CA); Scott Larrigan, Ottawa (CA)

(73) Assignee: Genband US LLC, Plano, TX (US)

( * ) Notice: Subject to any disclaimer, the term of this patent is extended or adjusted under 35 U.S.C. 154(b) by 967 days.

(21) Appl. No.: 10/675,645

(22) Filed: Sep. 30, 2003

(51) Int. Cl.
 *G06F 15/16* (2006.01)
(52) U.S. Cl. ......................... 709/227; 709/245
(58) Field of Classification Search .................. 709/227, 709/245
 See application file for complete search history.

(56) References Cited

U.S. PATENT DOCUMENTS

| | | | |
|---|---|---|---|
| 5,623,601 A | 4/1997 | Vu | |
| 6,226,751 B1 * | 5/2001 | Arrow et al. ............ | 726/15 |
| 6,493,349 B1 | 12/2002 | Casey | |
| 6,718,030 B1 * | 4/2004 | Turner et al. ............ | 379/221.02 |
| 6,741,585 B1 | 5/2004 | Munoz et al. | |
| 6,832,322 B1 | 12/2004 | Boden et al. | |
| 6,879,680 B2 | 4/2005 | Donovan et al. | |
| 7,085,270 B2 | 8/2006 | Inouchi et al. | |
| 7,107,614 B1 | 9/2006 | Boden et al. | |
| 7,143,188 B2 | 11/2006 | Maufer et al. | |
| 7,155,518 B2 * | 12/2006 | Forslow .................. | 709/227 |
| 7,155,740 B2 | 12/2006 | Brustoloni | |
| 7,216,173 B2 * | 5/2007 | Clayton et al. ........... | 709/227 |
| 7,304,986 B2 | 12/2007 | Allen et al. | |
| 7,330,463 B1 | 2/2008 | Bradd et al. | |
| 7,385,995 B2 | 6/2008 | Stiscia et al. | |
| 7,454,525 B1 | 11/2008 | Sethi | |
| 7,574,738 B2 * | 8/2009 | Daude et al. ............ | 726/15 |
| 7,593,388 B1 | 9/2009 | Mitchell et al. | |
| 7,640,319 B1 | 12/2009 | Sylvain et al. | |
| 2001/0012775 A1 | 8/2001 | Modzelesky et al. | |
| 2002/0057786 A1 * | 5/2002 | Donovan et al. ......... | 379/220.01 |
| 2002/0103931 A1 * | 8/2002 | Mott ...................... | 709/245 |
| 2002/0118671 A1 * | 8/2002 | Staples et al. ............ | 370/352 |
| 2002/0133534 A1 * | 9/2002 | Forslow .................. | 709/200 |
| 2003/0093536 A1 | 5/2003 | 't Hooft | |

(Continued)

FOREIGN PATENT DOCUMENTS

EP 769882 A1 * 4/1997

(Continued)

OTHER PUBLICATIONS

Notice of Allowance and Fee(s) Due for U.S. Appl. No. 10/675,063 (Oct. 2, 2009).

(Continued)

*Primary Examiner* — Firmin Backer
*Assistant Examiner* — Brian P Whipple
(74) *Attorney, Agent, or Firm* — Jenkins, Wilson, Taylor & Hunt, P.A.

(57) ABSTRACT

A VPN media proxy for communication between VPNs and external networks having different addressing schemes, has interfaces to the two or more VPNs, a configuration store, and an address translator arranged to translate the source and destination address of the information based on the configuration. Sharing of the proxy by many VPNs can keep costs down or enable more VPNs to be provided. A call server also shared by the VPNs is used to set up the session and to establish the configuration. The proxy can have an address within each VPN so that it appears to be a dedicated resource for each VPN.

25 Claims, 7 Drawing Sheets

U.S. PATENT DOCUMENTS

| | | | |
|---|---|---|---|
| 2003/0093563 A1 | 5/2003 | Young et al. | |
| 2003/0118002 A1* | 6/2003 | Bradd et al. | 370/352 |
| 2003/0120502 A1* | 6/2003 | Robb et al. | 705/1 |
| 2003/0147402 A1 | 8/2003 | Brahim | |
| 2003/0149899 A1* | 8/2003 | Boden et al. | 713/201 |
| 2003/0177221 A1* | 9/2003 | Ould-Brahim et al. | 709/223 |
| 2004/0032863 A1* | 2/2004 | Schoeneberger | 370/356 |
| 2004/0073642 A1* | 4/2004 | Iyer | 709/223 |
| 2004/0088542 A1* | 5/2004 | Daude et al. | 713/156 |
| 2004/0105459 A1 | 6/2004 | Mannam | |
| 2004/0136534 A1 | 7/2004 | Stiscia et al. | |
| 2004/0136712 A1 | 7/2004 | Stiscia et al. | |
| 2004/0260747 A1* | 12/2004 | Ying et al. | 709/200 |
| 2005/0047713 A1 | 3/2005 | Antosik | |
| 2005/0068942 A1 | 3/2005 | Chu et al. | |
| 2005/0105708 A1 | 5/2005 | Kouchri et al. | |
| 2005/0111469 A1 | 5/2005 | Howell | |
| 2005/0141504 A1 | 6/2005 | Rembert et al. | |
| 2005/0220014 A1 | 10/2005 | DelRegno et al. | |
| 2005/0220143 A1 | 10/2005 | DelRegno et al. | |
| 2005/0220148 A1 | 10/2005 | DelRegno et al. | |
| 2005/0226210 A1 | 10/2005 | Martin | |
| 2006/0013209 A1* | 1/2006 | Somasundaram | 370/389 |
| 2006/0239242 A1 | 10/2006 | Huffschmid | |
| 2007/0064594 A1 | 3/2007 | Norton | |
| 2007/0140250 A1 | 6/2007 | McAllister et al. | |
| 2008/0285438 A1 | 11/2008 | Marathe et al. | |

FOREIGN PATENT DOCUMENTS

| | | |
|---|---|---|
| EP | 1365552 A1 * | 11/2003 |
| EP | 1 768 343 A2 | 3/2007 |

OTHER PUBLICATIONS

Corrected Notice of Allowance and Fee(s) Due for U.S. Appl. No. 10/675,162 (Jul. 21, 2009).

Notice of Allowance and Fee(s) Due for U.S. Appl. No. 10/675,162 (Jul. 10, 2009).

Official Action for U.S. Appl. No. 10/675,063 (Mar. 5, 2009).

Notice of Allowance and Fee(s) Due for U.S. Appl. No. 10/675,162 (Jan. 6, 2009).

Final Official Action for U.S. Appl. No. 10/675,063 (Oct. 20, 2008).

Official Action for U.S. Appl. No. 10/675,162 (Jun. 13, 2008).

Final Official Action for U.S. Appl. No. 10/675,162 (Mar. 13, 2008).

Official Action for U.S. Appl. No. 10/675,063 (Nov. 28, 2007).

Official Action for U.S. Appl. No. 10/675,162 (May 17, 2007).

Official Action for U.S. Appl. No. 10/675,063 (May 10, 2007).

"Gateway Control Protocol: Version 3; Series H: Audiovisual and Multimedia Systems; Infrastructure of Audiovisual Services—Communication Procedures," ITU-T, H.248.1, pp. 1-206 (Sep. 2005).

"Tech Note," SonicWall, pp. 1-18 (Sep. 2005).

Schulzrinne et al., "RTP: A Transport Protocol for Real-Time Applications," Network Working Group, RFC 3550 (Jul. 2003).

Rosenberg et al., "STUN—Simple Traversal of User Datagram Protocol (UDP) Through Network Address Translators (NATs)," Network Working Group, RFC 3489 (Mar. 2003).

Andreasen et al., "Media Gateway Control Protocol (MGCP) Version 1.0," Network Working Group, RFC 3435 (Jan. 2003).

"Series H: Audiovisual and Multimedia Systems; Infrastructure of Audiovisual Services—Communication Procedures; Implementers Guide for Recommendations of the H.323 System: H.323, H.225.0, H.45, H.246, H.283, H.235, H.341, H.450 Series, H.460 Series, and H.500 Series," ITU-T, H.323 System Implementers Guide, pp. 1-118 (Oct. 25, 2002).

Hernandez-Valencia, "Hybrid Transport Solutions for TDM/data Networking Services," IEEE Communications Magazine, vol. 40, Issue 5, pp. 104-112 (May 2002).

"SonicWALL Internet Security Appliances; SonicOS Standard 2.2 Administrator's Guide," SonicWall, pp. 1-184 (2002).

Kankkunen, "MPLS and Next Generation Access Networks," Universal Multiservice Networks, ECUMN 2000, $1^{st}$ European Conference on Oct. 2-4, 2000, pp. 5-16.

Rosen et al., "BGP/MPLS VPNs," Network Working Group, RFC 2547 (Mar. 1999).

Handley et al., "SDP: Session Description Protocol," Network Working Group, RFC 2327 (Apr. 1998).

Schulzrinne et al., "RTP: A Transport Protocol for Real-Time Applications," Network Working Group, RFC 1889 (Jan. 1996).

* cited by examiner

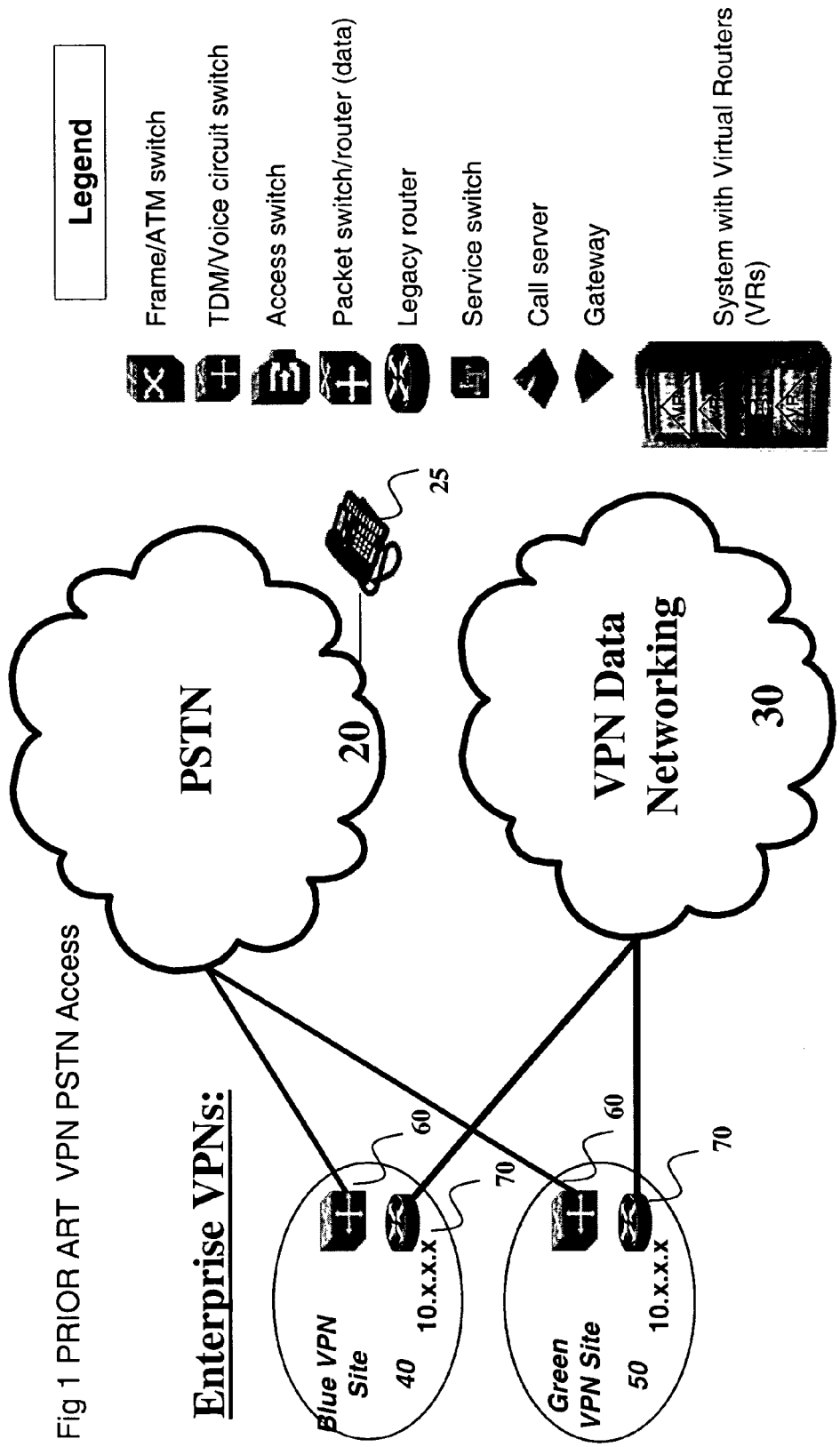

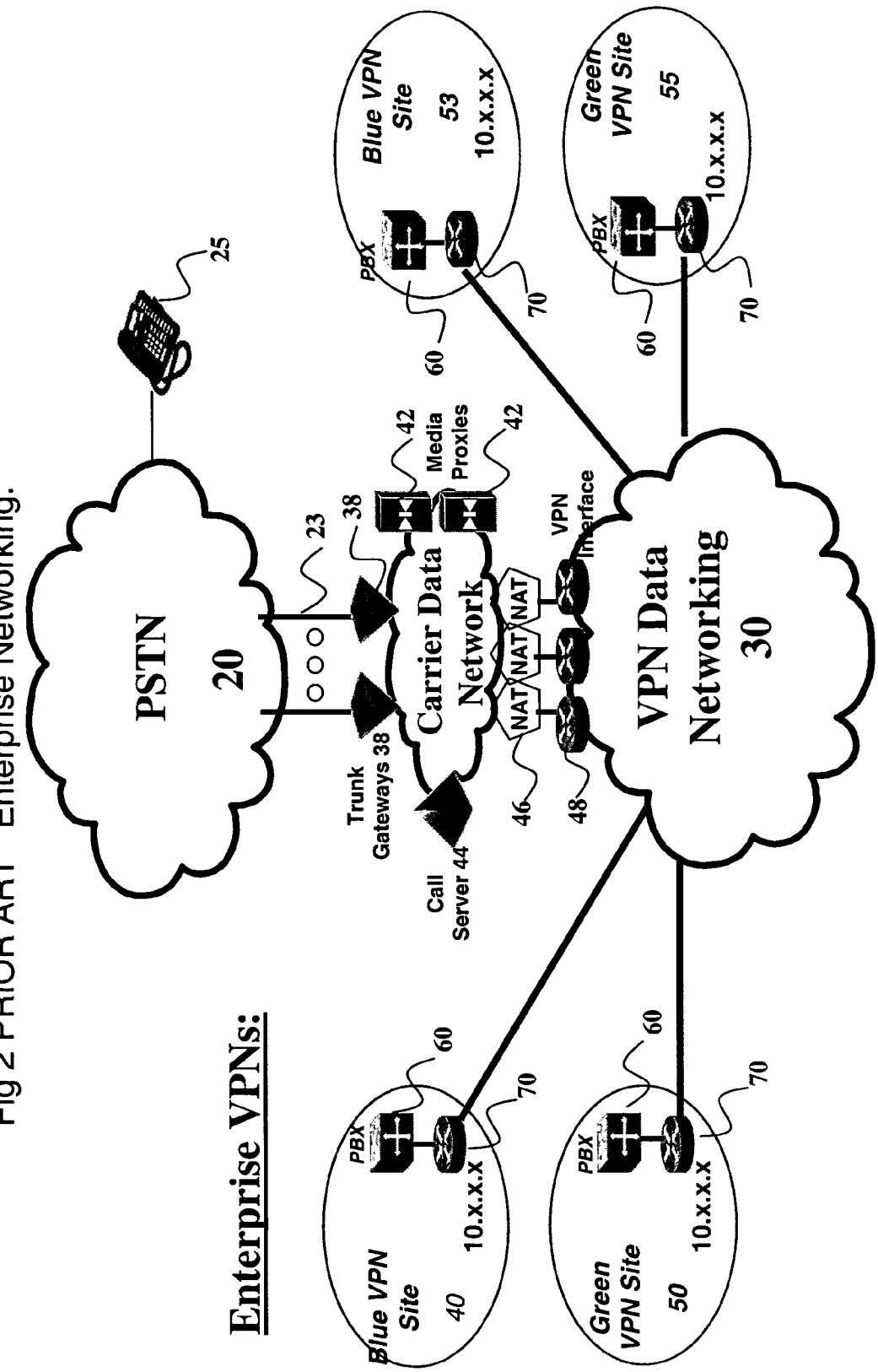
Fig 2 PRIOR ART  Enterprise Networking:

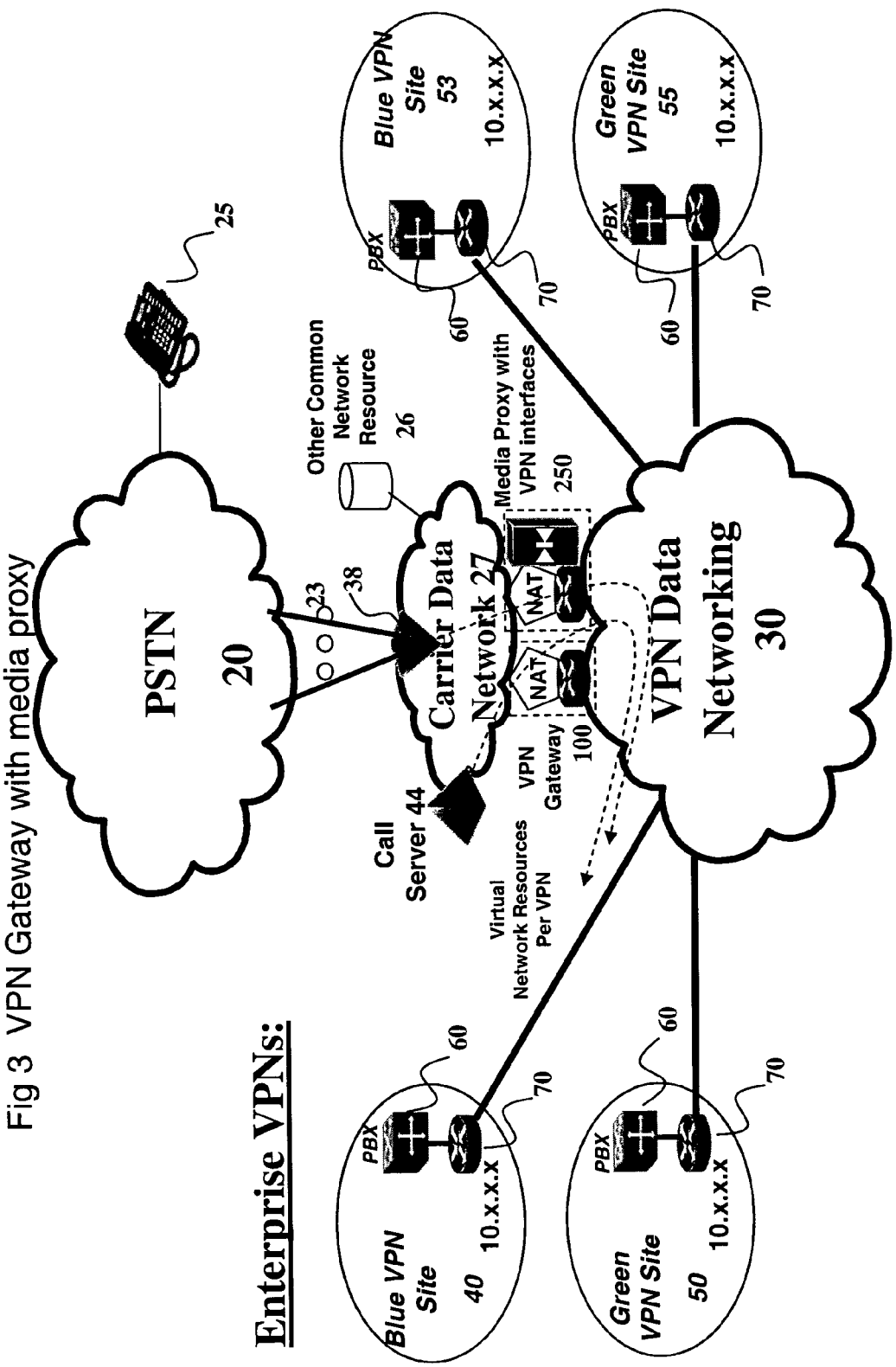

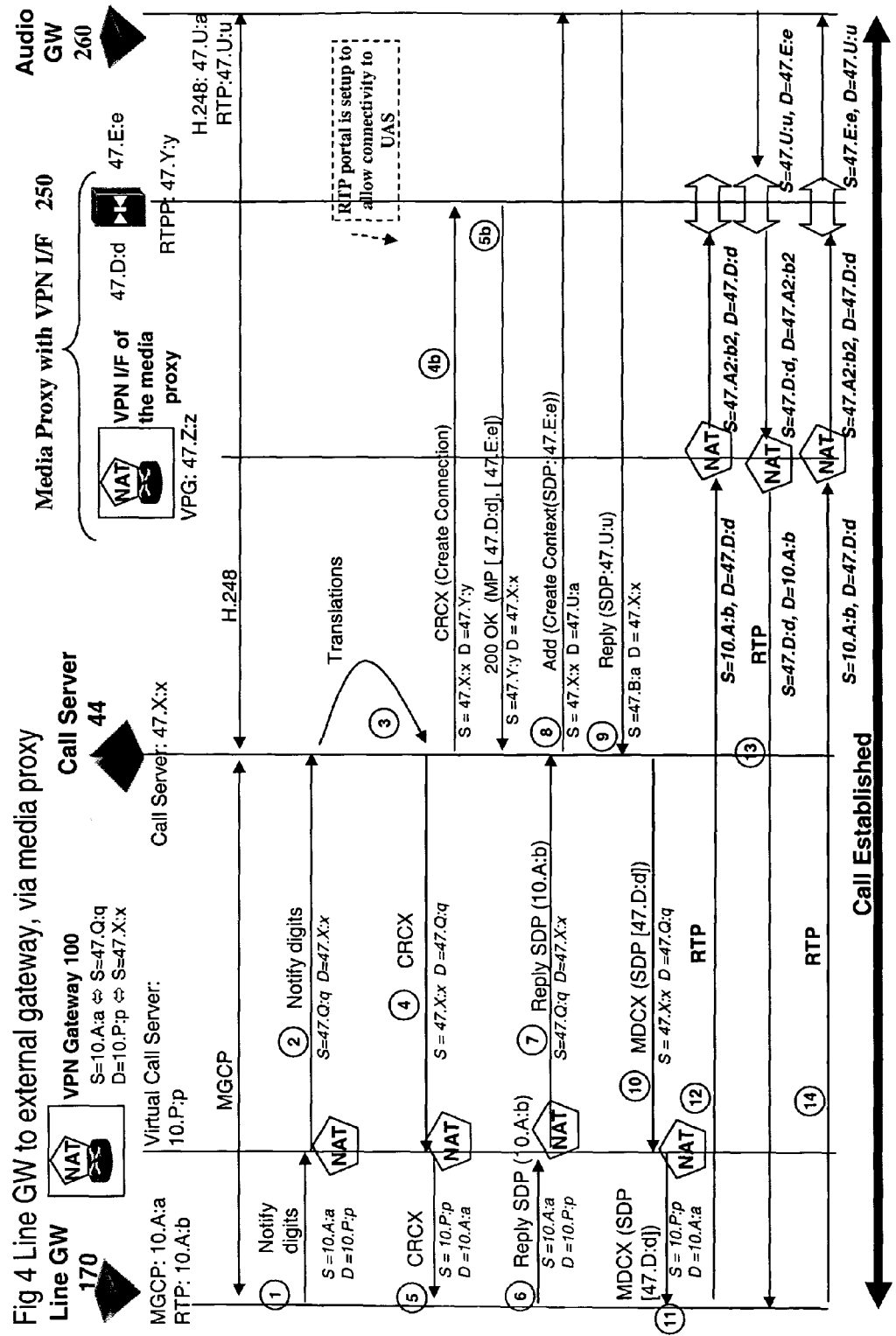

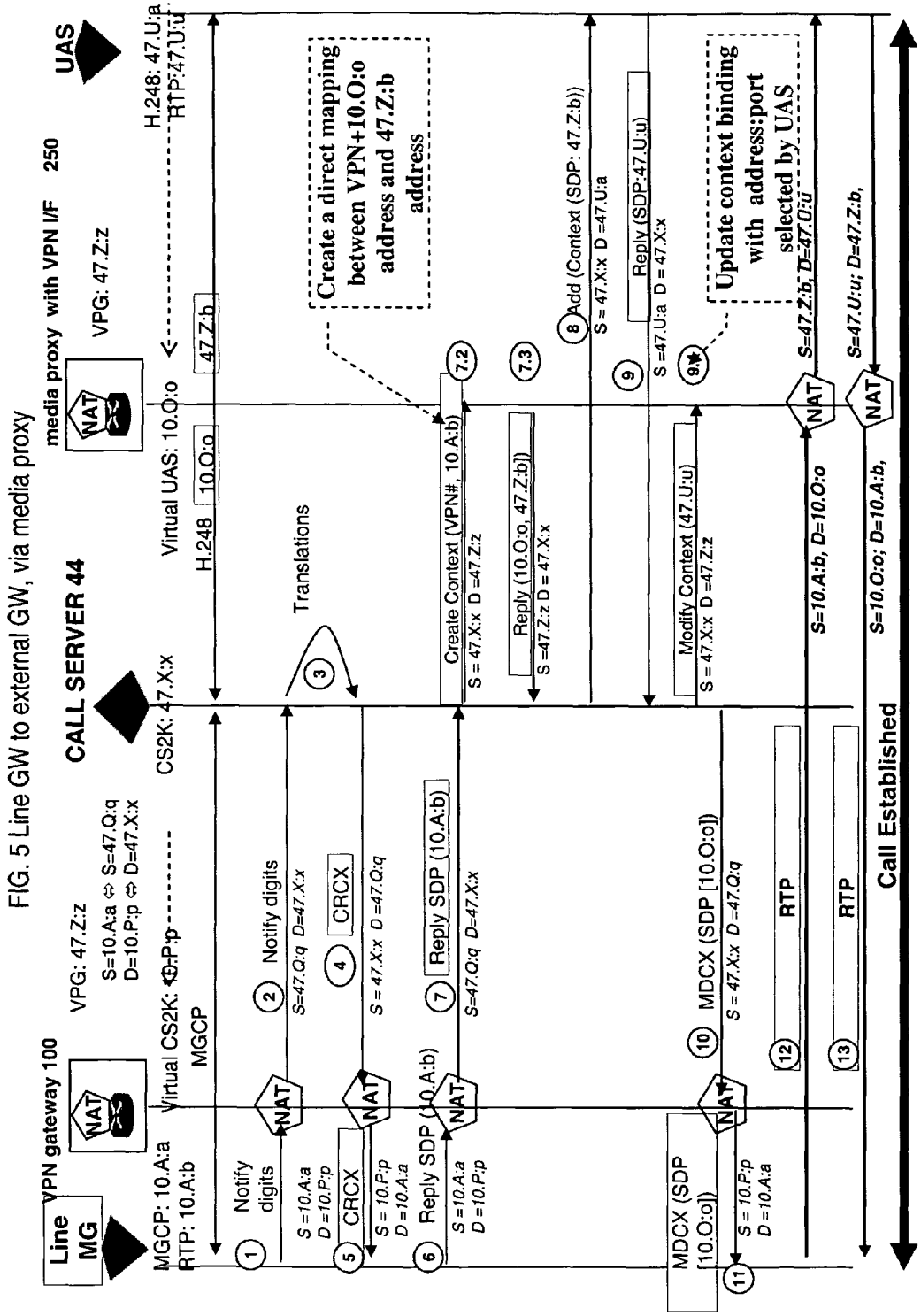
FIG. 5 Line GW to external GW, via media proxy

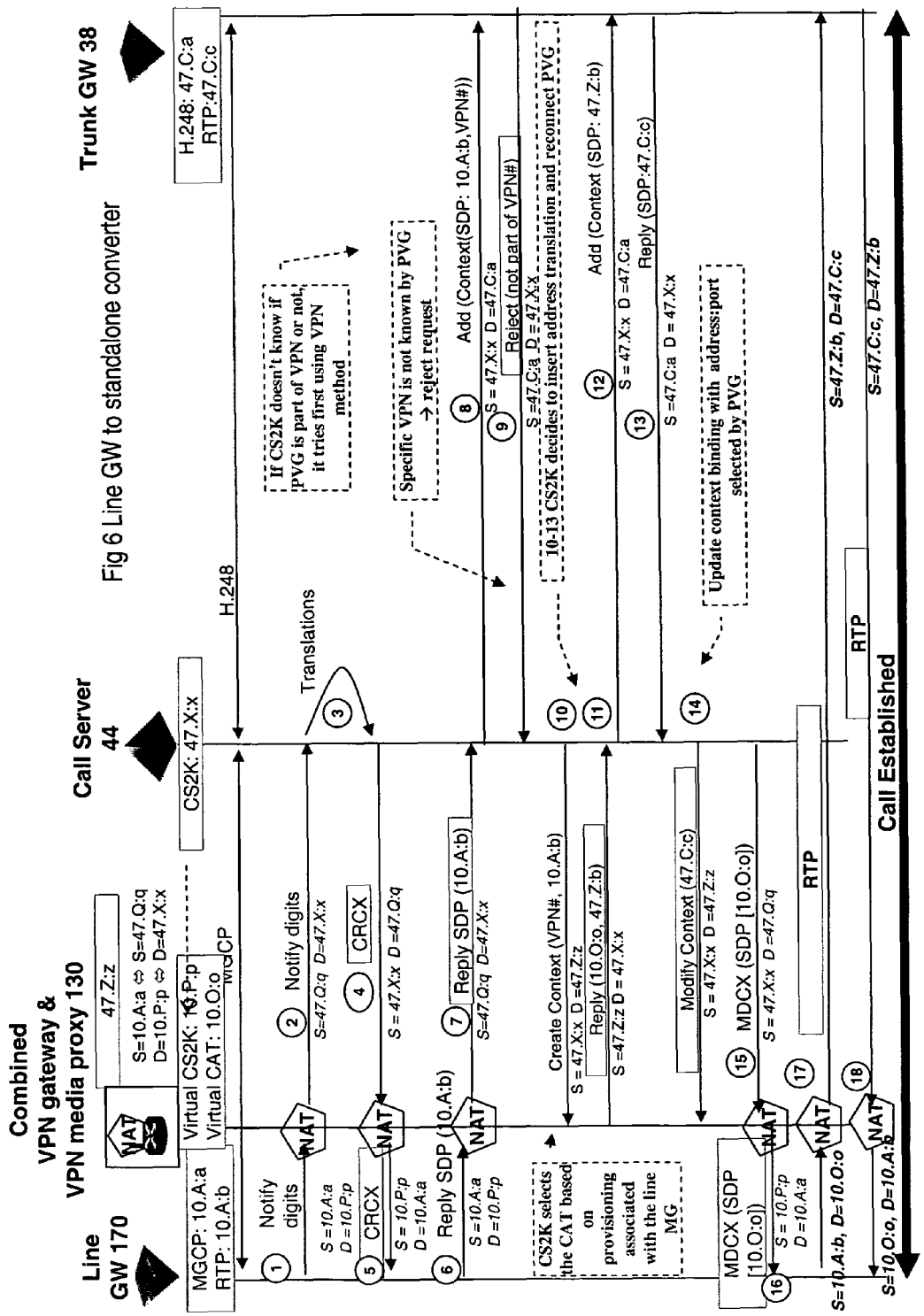
Fig 6 Line GW to standalone converter

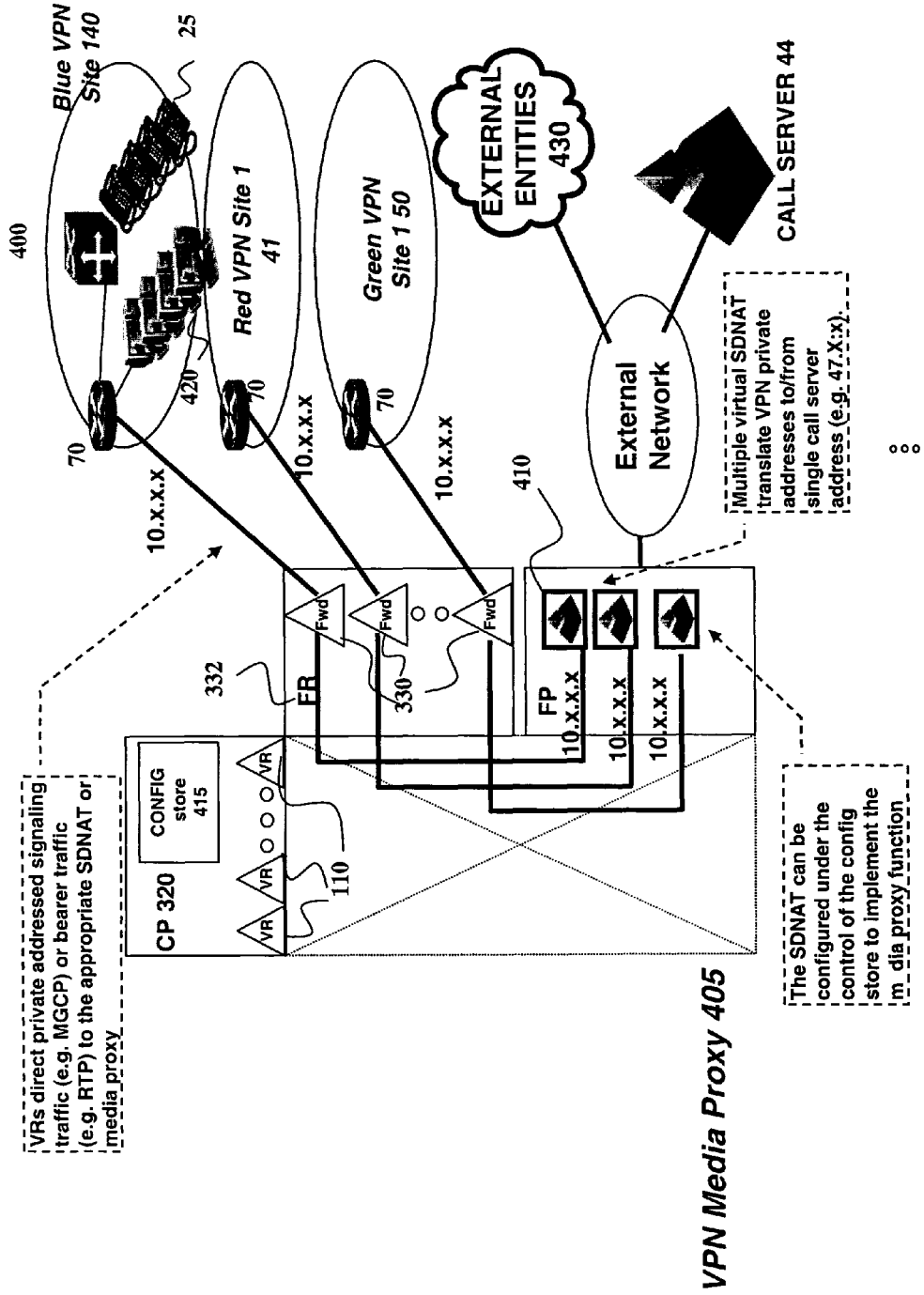
Fig 7 VPN media proxy

US 8,051,177 B1

MEDIA PROXY HAVING INTERFACE TO MULTIPLE VIRTUAL PRIVATE NETWORKS

RELATED APPLICATIONS

This invention relates to copending U.S. patent application Ser. Nos. 10/675,063 and 10/675,162 entitled "Gateway shared by multiple virtual private networks" and "Convertor shared by multiple virtual private networks" respectively, of even filing date, and hereby incorporated by reference.

FIELD OF THE INVENTION

This invention relates to media proxies having interfaces to two or more VPNs (Virtual private networks or virtual packet networks), to methods and software for such apparatus, and to methods of offering a VPN service over such apparatus.

BACKGROUND TO THE INVENTION

A broad definition of a VPN is 'any network built upon a public network and partitioned for use by individual customers'. This results in public frame relay, X.25, and ATM networks being considered as VPNs. These types of VPNs are generically referred to as Layer 2 VPNs. Another form of VPNs are networks constructed across shared IP backbones, referred to as 'IP VPNs' or Internet VPNs. IP VPNs are provided typically using well engineered and protected IP networks. One popular type of VPN is described in RFC 2547 as published by the Internet Engineering Task Force. On the other hand, Internet VPN uses the open, distributed infrastructure of the Internet to transmit data between corporate sites. Companies using an Internet VPN set up connections to the local connection points (called points-of-presence [POPS]) of their Internet service provider (ISP) and let the ISP ensure that the data is transmitted to the appropriate destinations via the Internet, leaving the rest of the connectivity details to the ISP's network and the Internet infrastructure. Because the Internet is a public network with open transmission of most data, Internet-based VPNs may include measures for encrypting data passed between VPN sites, which protects the data against eavesdropping and tampering by unauthorized parties. Business uses of VPNs include Remote Access, Site-to-Site links and Extranets References to VPNs are intended to encompass networks with their own private or non private addressing plan, using shared resources such as call servers or gateways.

If such VPNs are offered as a service by a service provider such as telecoms carrier organizations, they will typically be arranged to have security gateways. Security gateways sit between public and private networks, preventing unauthorized intrusions into the private network. They may also provide tunneling capabilities and encrypt private data before it is transmitted on the public network. In general, a security gateway for a VPN can be implemented as part of a router, or of a firewall, or of integrated VPN hardware, or of VPN software. A security gateway also frequently includes network address translators (NAT). The NAT provides two key functions. First, it allows the enterprise to use a private IP addressing numbering plan (such as 10.x.x.x), frequently needed due to the scarceness of IP addresses with IPv4. Secondly, NAT adds another layer of security as it effectively hides the address of devices in the enterprise and blocks any unsolicited attempt to connect with them from the public network. Unfortunately, NAT has the side effect of modifying the IP address and port address of devices in the private network when they communicate with the public network. As is well known, a number of protocols running above the IP layers, such as call processing (e.g. ITU H.248, ITU H.323, IETF MGCP (Media Gateway Control Protocol) (RFC 3435)) and voice transport protocols (e.g. IETF RTP (RFC 1889)) are disrupted by this address translation. A number of techniques have been implemented to get around the NAT problem but all have some form of drawbacks, in term of equipment cost or configuration complexities. The IETF Midcom (Middlebox Communication) working group has proposed two pre-midcom solutions: First, Media Proxies can be inserted into the call, which will be described below, with reference to FIG. 2. However they are costly additional hardware, and may not be on the natural path of the media resulting in media triangulation problems and added delay. Alternatively, the STUN protocol can be used by the gateway, but this results in all calls being public and negates the other advantages of using the VPNs for such traffic. STUN is the Simplified Traversal for UDP NAT as defined by the IETF—RFC 3489 on STUN—Simple Traversal of User Datagram Protocol (UDP) Through Network Address Translators (NATs). This invention addresses such problems and the additional complexities of network configuration and equipment that they can cause.

FIG. 1 shows how enterprises typically use VPNs today. Enterprises have multiple sites that need to be interconnected for data traffic. By subscribing to a VPN service from a public carrier, they do not need to setup dedicated point to point transmission circuits such as DS1 or E1 between each sites. Instead, they interconnect at the edge of the public carrier's network using one transmission circuit and from there, the carrier's VPN equipment routes the traffic to the proper end point (other sites for the same enterprise) which are similarly attached to the carrier's VPN network. In this example, all voice traffic, either going to the PSTN (public service telephone network) or going to other enterprise sites is handled separately. In FIG. 1, a VPN data networking environment 30 is provided by a service provider for a number of enterprises. Two examples are shown, a "blue" VPN site 40, and a "green" VPN site 50. The green enterprise uses the private 10.x.x.x address range and similarly, the green VPN uses the overlapping private 10.x.x.x address range. In practice, each VPN would have multiple sites, only one is shown for each VPN. Each site has a router 70 for routing IP packet to the VPN data networking environment, which can be the public internet or private networks. Each site has a PBX 60, coupled to the PSTN 20, to reach a generic destination phone 25.

It is known to use a VPN not only for data traffic but also for voice traffic. The advantage of this is that it can reduce the expense and equipment otherwise needed for handling those types of traffic separately. An example is shown in FIG. 2. FIG. 2 shows a known example in which voice traffic is carried over the VPN to reach the PSTN 20. Corresponding reference numerals to those of FIG. 1 have been used where appropriate. The TDM/voice circuit switch 60, typically in the form of a (private branch exchange) is now coupled to the VPN router 70 at each of the VPN sites. Inter-site voice traffic can stay within the enterprise VPN but a means to access the PSTN is needed. This is implemented by means of trunk gateways 38 for coupling PSTN trunks 23 to a carrier data network 27. The carrier data network is coupled to each of the VPNs in the data networking environment by one or multiple NATs 46 (network address translator) and VPN interface routers 48. The carrier data network 27 includes one or multiple call servers 44 for controlling the call and handling signaling packets. The carrier data network 27 also includes media proxies 42 to get around the NAT problem described earlier. The operation of such an arrangement will now be summarized.

Calls originate from the enterprise users connected to a telephony switch, typically a local PBX, and then go through a conversion to VoIP (Voice over IP) form, either via a media gateway inside the PBX itself or via an external media gateway. Instead of being routed over the public service telephone network (PSTN), the VoIP traffic is merged with the data traffic at the local VPN router 70. If the call is to another enterprise site connected in similar fashion to the VPN, then the VoIP traffic simply flows from site to site along with the data traffic. However, if the call is to be between a VPN site and a user on the PSTN, then the VoIP traffic needs to exit the VPN confines. This is typically done by interworking the enterprise VPN with the carrier data network where the equipment needed to interface to the PSTN reside. The interworking can be done a number of ways and may involve multiple interconnection points depending on the size of the network, but would in most cases involve going through a NAT. The NAT is needed to allow the devices in the enterprise using the enterprise IP addresses (frequently using the reserved IP private address range 10.x.x.x) to establish communication with the devices in the carrier data network using its own IP addressing scheme, using either public or private IP addressing. The PBX 60 and associated media gateway communicate with the call server 44 to establish calls to the PSTN. The call server 44 selects one trunk gateway 38 to complete the call to the PSTN. Because of the NAT, the call server cannot simply provide the enterprise media gateway and the trunk gateway with each others respective IP addresses and let the gateways send VoIP packets to each other as would normally be the case. The IP addresses for each gateway are corrupted by the NAT operation. To get around this problem, the call server 44 can put in the call path specialized media proxies 42 whose operation allows both gateways to communicate with each other. The call server 42 instructs the enterprise media gateway and the trunk gateway to send their packets to the media proxy 42. Essentially the media proxy 42 patches together the VoIP flow coming from the enterprise media gateway and the trunk gateway, as instructed by the call server 44 by learning the translated IP addresses from VoIP packets sent to it. Multiple enterprise VPNs can be interconnected to the carrier data network in similar fashion and share the infrastructure needed to access the PSTN.

These complex addressing arrangements allow the central call server of the service provider to provide services for VoIP end points connected into a number of VPNs. They add considerable complexity and cost in terms of capital expenditure and running costs. Such costs escalate rapidly as the number of VPNs increases.

SUMMARY OF INVENTION

It is an object of the present invention to provide improved apparatus and methods. According to a first aspect of the present invention, there is provided:
A VPN media proxy for coupling information between any of two or more VPNs and one or more external networks, the external network or networks having different addressing schemes to those of the VPNs, the media proxy having interfaces to the two or more VPNs, a configuration store, and an address translator arranged to translate the source and destination address of the information based on the stored configuration, and send the information on towards the modified destination address.

This is notable for enabling sharing of the media proxy by many VPNs. This can enable the number of network entities to be reduced or and hence a simpler or more scalable network arrangement, and hence reduced capital and maintenance costs. For software implementations there can be a reduction in the number of software modules and thus lower memory requirements and reduced complexity. It can enable more VPNs to be provided, or a better VPN service for a given level of cost or complexity. This is particularly applicable where some or all of the traffic comprises types of communication sessions that are disrupted by NAT devices and so a media proxy is warranted to allow those communication sessions to traverse NAT successfully.

A media proxy enables successful NAT traversal by providing a common target point in the external network for the originating and terminating endpoints of a communication session where one or both the originating and terminating endpoints are behind NAT. The media proxy is configured to relay the traffic stream from one end point to the other by manipulating the source and destination IP addresses of the traffic stream.

An additional feature for a dependent claim is the VPN media proxy being arranged to cooperate with a call server to set up a communication session for sending the information between an entity in any of the VPNs and the external network or networks.

This is notable for efficiencies which can arise from sharing of the server for centralized control, as well as sharing of the proxy by multiple VPNs.

Another such additional feature is the VPN media proxy being arranged to cooperate with the call server to establish the configuration.

This can also help the call server to retain control of how the session is handled. This effectively centralizes control and can ease management issues such as future increases in capacity or addition of new services. Alternatively it is also feasible for the proxy to control its own configuration.

Another such additional feature is the VPN media proxy being arranged to establish the configuration by providing first and second interface addresses to the call server, to enable the call server to interact with originating and terminating entities to establish the communication session and establish originating and terminating addresses, the proxy also being arranged to receive from the call server an association of first and second interface addresses with originating and terminating addresses for use in establishing the configuration.

This can enable the call server to control and monitor the set up of the session.

Another additional feature is the VPN media proxy being arranged to establish the configuration by providing two target addresses to the call server, to enable the call server to pass a target address to each of originating and terminating entities of the communication session, the proxy also being arranged to receive information from the originating and terminating entities addressed to the respective target address, the proxy further being arranged to associate the information addressed to that target address for use in establishing the configuration.

This alternative is a way of sharing control of the set up between the call server and the proxy.

Another additional feature is the VPN interfaces comprising one of IP, ATM, Frame Relay, and MPLS interfaces.

These are notable for enabling the proxy to be used with the most widely used and commercially significant types of network.

Another additional feature is the VPN interfaces comprising an IP interface, and the configuration comprises an IP address of an originating entity, an IP address for a first interface of the proxy, an IP address for a second interface of the proxy, and an IP address of a terminating entity.

Another additional feature is the proxy being suitable for use with multiple VPNs using overlapping private IP addressing schemes.

An advantage of this is that each VPN can arrange their IP addressing independently, without having to take account of risk of conflict or ambiguity with corresponding addresses in other VPNs.

Another additional feature is the communication sessions being one of data sessions, telephony calls, or video calls.

These are notable for being widely used and commercially significant types of sessions. Others can be used.

Another additional feature is the proxy being arranged to communicate to external entities the VPN identity associated with a given communication session.

An advantage of this is that where the external entity (e.g. a call server) needs to know the VPN, it can prove simpler or more reliable if the external entity need not deduce itself the VPN identity for a given communication session.

Another additional feature is that the interfaces comprise logical or physical ports each corresponding to a different one of the VPNs, and the determination of the VPN identity is based on which of the ports is used for the communication session.

This is a practical way of enabling differentiation of the VPNs without undue complexity.

Another aspect of the invention provides a server for controlling a communication session between any of two or more VPNs and one or more external networks, the external network or networks having different addressing schemes to those of the VPNs, the session passing via the above mentioned media proxy, the server being arranged to cooperate with the media proxy to set up the session.

An additional feature is the server being arranged to alert the media proxy of the identity of the VPN related to the session.

Another aspect provides corresponding methods of interfacing using such a VPN media proxy.

Another aspect provides a method of offering a virtual private network service using the VPN media proxy.

The advantages of the apparatus can feed through to enable improvements to be made in the services using the apparatus, and the value of such services can increase. Such increased value over the life of the system, could prove far greater than the sales value of the equipment.

Another aspect provides a node for a network, the node having a VPN media proxy as set out above.

Another aspect provides:
software for carrying out the methods. This acknowledges that software can be a valuable, separately tradable commodity. It is intended to encompass software, which runs on or controls "dumb" or standard hardware, to carry out the desired functions, (and therefore the software essentially defines the functions of the media proxy, and can therefore be termed a media proxy, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions.

Another aspect of the invention provides a sequence of signals to and from a VPN media proxy which is arranged to couple information between any of two or more VPNs and one or more external networks, the external network or networks having different addressing schemes to those of the VPNs, the sequence comprising a signal from an entity of one of the VPNs, addressed to an entity in the external network which appears to have an address within the address range of the respective VPN, and a signal returned from the entity in the external network, and routed by the VPN media proxy back to the entity in the respective VPN.

An additional feature for a dependent claim is a signal from the VPN media proxy to the entity in the external network containing an identity of the respective VPN.

Any of the features can be combined with any of the aspects of the invention as would be apparent to those skilled in the art. Other advantages will be apparent to those skilled in the art.

BRIEF DESCRIPTION OF THE DRAWINGS

To show by way of example how the invention can be implemented, embodiments will now be described with reference to the figures in which:

FIG. 1 shows a known arrangement of VPNs with separate voice and data networks,

FIG. 2 shows another known arrangement of VPNs with the PSTN coupled to the VPNs, FIG. 3 shows VPNs sharing a VPN gateway according to a first embodiment of the invention, FIGS. 4, 5 and 6 show embodiments in the form of sequence charts of call set up via the VPN media proxy using a call server, and FIG. 7 shows an embodiment of a VPN media proxy.

DETAILED DESCRIPTION OF EMBODIMENTS

FIG. 3, embodiment of VPN Gateway with Media Proxy

FIG. 3 shows a first embodiment of the invention. As in FIG. 2, voice traffic is handled by the VPN data networking environment. A simplified interface between this environment, having a number of VPNs, and external networks including the PSTN 20, is provided by the VPN gateway 100, the VPN media proxy 250 and the trunk gateway 38. In this example, the external networks are exemplified by the carrier data network and the PSTN. The call server is an example of an entity in the address space of the carrier data network, and PSTN telephones are examples of entities in the address space of the PSTN. The example of the VPN gateway provides an interface to the call server, and to other entities of external networks. The VPN gateways and the VPN media proxies are shared by a number of VPNs. As shown diagrammatically, each gateway can combine the functions of a router and a NAT, and possibly other functions. The PSTN trunks are connected indirectly to the VPNs via the VPN media proxy and the trunk gateway. The VPN gateway handles the signaling traffic passing between the call server 44 and the VPN data networking environment 30, by translating packet source and destination addresses, and by routing to or from the correct one of the VPNs. Hence, the VPN gateway can effectively combine two functions, an SDNAT (source and destination NAT) interface to the call server 44 on the carrier data network, to ensure privacy and security of the call server, and an interface for bearer traffic to and from the external networks. This gateway can include a number of virtual routers which feed packets to the NAT function of the gateway if they are signaling packets destined for the call server 44. The virtual router is effectively in the address space of one of the VPNs. Other virtual routers are provided in the address spaces of other VPNs. Hence each VPN appears to have a dedicated call server, though it is actually a shared resource.

Packets relating to the call once it is set up are routed via the VPN media proxy 250 for coupling to the PSTN 20. The VPN media proxy 250 integrates the functionality of the VPN gateway with the functionality of a media proxy. As the VPN media proxy has VPN interfaces, it is seen by the VPNs as being in the address space of each VPN. Hence it appears as a dedicated resource though it is in fact shared.

Signaling and bearer packet flows for a VoIP call in the embodiment of FIG. 3 are shown by dotted lines. One dotted line shows a flow of signaling packets from the router 70 from the enterprise "blue" VPN site 40 through the VPN data network 30 to the shared gateway 100. From here they are sent by the virtual router of the gateway to the NAT component of the gateway and then over the carrier data network 27 (e.g. using standard IP routing) to the call server 44. More details of the sequence of signaling packets will be explained with reference to other figures below. Once the VoIP call has been set up using the signaling packets, the bearer packets carrying the voice information are transmitted as shown by the other dotted line in the figure. This extends from the router 70 of the "blue" VPN site 140 through the VPN data network 30 to a virtual router of the VPN media proxy. This VPN media proxy changes the source and destination addresses of the bearer packets and routes them to the trunk gateway over the carrier data network for conversion into TDM signals for the PSTN.

FIG. 4 Sequence Chart of Call Set Up with VPN Identifier

FIG. 4 shows a sequence chart for a VoIP call setup suitable for use in the arrangement shown in FIG. 3. Corresponding reference numerals have been used where appropriate. In this sequence chart, succeeding time instances are represented by the downward direction in the chart. The six columns represent events or steps at six different entities in the arrangement. The left-hand column shows the functions of a line gateway 170 at one VPN site which is coupled to the source of the call. The second column shows the functions of the shared VPN gateway 100, which includes a NAT function. The third column shows the functions of the call server 44. The fourth column shows the functions of the VPN I/F of the media proxy. The fifth column shows the functions of the media proxy, and the sixth column shows the functions of an audio gateway 260, for example a trunk gateway or a gateway to a PBX.

The figure shows the IP addresses used in the headers of the packets sent between the entities. The letter S indicates the source address, and the letter D indicates the destination address. Letters A, Q, X and P represent variables. The letter after the colon indicates the UDP port. 10.x indicates a VPN address, and 47.x indicates a service provider address within the private network of the service provider. In this example, MGCP is used to communicate between the line gateway and the call server 44. MGCP is a well known standard, other alternatives can be conceived. The H.248 standard is used between the call server and other entities. Again other standards are conceivable.

At step 1, the line gateway 170 initiates a VoIP call setup by notifying the dialed digits of the call to the call server. The call server has a real IP address of 47.X:x in the external address which is mapped by the VPN gateway SDNAT function to an internal VPN address of 10.P:p. This address is routable within the VPN network to the VPN gateway. Therefore, the notification is routed by the VPN data network to the VPN gateway. At the VPN gateway, the virtual router passes it to the SDNAT component of the VPN gateway. The SDNAT component carries out an SDNAT operation at step 2 and passes the packet with the modified source and destination addresses to the call server 44. At step 3 the call server undertakes translations and determines an end destination for the call, in terms of which gateway the call should be sent to. At steps 4 and 5, an acknowledgement is returned by the call server toward the line gateway 170, in the form of a CRCX (create connection) message. The SDNAT component has stored a correspondence or mapping, and therefore is able to reconvert the packet addresses to enable the packet to reach the originating line gateway 170.

At the same time, step 4b, a CRCX message is also sent from the call server to the media proxy requesting two target addresses, in the address range used by the media proxy. In step 5b, the media proxy respond to the call server with two target addresses it reserved and configured. The call server will use those addresses in step 8 and 10 when setting up the communication session between the originating and terminating entities.

Any call processing carried out by the call server or the media proxy (or by any external server) may be specific to each VPN, in which case the call server needs to know the identity of the VPN. It may be able to deduce this from the private address, or the VPN gateway can send an indication of the identity of the VPN.

At step 6 the originating line gateway replies to the message in step 5 with a message containing SDP (Session Description Protocol, IETF RFC 2327) parameters to the call server 44 via the SDNAT component of the VPN gateway. At step 7 this is passed on by the VPN gateway. The SDP contains the VPN address selected by the originating line gateway to establish the voice communication. At step 8, the call server responds by sending a create context message to the destination, in this case the audio gateway 260. The originating line gateway SDP information is modified by the call server and now provides an address which is one of the media proxy addresses obtained in step 5b. This modified address is received by the audio gateway 260 and will get used by the audio gateway to send packets toward the originating line gateway but transiting via the media proxy. In step 9, the audio gateway 260 responds by sending the IP network address it selected for the communication session. Steps 10 and 11 show the call server sending an MDCX (modify connection) message to the originating the line gateway 170 via the VPN gateway, including not the audio gateway address obtained in step 9 but the second target address obtained from the media proxy in step 5b. The originating will use this address to establish the communication session toward the audio gateway 260 (in the form of an RTP stream (real time protocol, IETF RFC 3350)) but transiting via the media proxy as shown is step 12. Because the originating line gateway is in the VPN, it needs to transit first through the VPN gateway portion of the VPN media proxy. The VPN gateway provides the NAT function and maps the packets to the external network address space (S=47.A2:b2). The packets are then forwarded to the media proxy function. When the media proxy receives the first packet at the first target address, it records the source address of the incoming packet to send later packets back to that address. In other words, the media proxy creates an association between the originating line gateway source address (modified by the NAT) and the first target address. In parallel, following the response at step 9, the audio gateway 260 also starts sending packets (step 13) associated to the communication session toward the media proxy, as instructed in step 8. When the media proxy receives the first packet at the second target address from the audio gateway 170, it records the source address of the incoming packet to send later packets back to that address. In other words, the media proxy creates an association between the audio gateway 260 source address and the second target address. The media proxy uses the association it created in step 5b between the first and second target addresses and the association it created in step 12 between the originating line gateway address and the first target address to forward on the packets from the audio gateway 260 toward the line gateway 170 (at the line gateway address mapped by the NAT. The NAT forwards on the packet to the line gateway 170). The originating line gateway continues sending packets for the communication session (step 14) toward the media proxy. Because of the association of addresses done in step 13, the media proxy can now forward on the incoming packets to the IP address of the audio gateway 270.

FIG. 5 Sequence Chart of Calls Set Up with VPN Identifier

FIG. 5 shows a similar VoIP call setup sequence chart to that of FIG. 4 and corresponding reference numerals have been used as appropriate. In this case the destination is an external universal audio server. In this case, the call server identifies the VPN and alerts the media proxy as to the identity of the VPN. At step 3, the call server understands which VPN the call is from based on the MG (media gateway) source SP address and port. At step 7 the call server receives the reply SDP packet and adds an identifier for the appropriate VPN. One benefit of identifying the VPN is to enable sharing of the media proxy by many VPNs using a simpler equipment configuration. At step 7.2 the call server requests the VPN media proxy to provide two target addresses as in FIG. 4, but this time includes the VPN identifier in the create context message to the media proxy, to enable the media proxy to know which VPN to connect with. The call server also includes the address of the originating line gateway (10.A:b), allowing the VPN media gateway to pre-build its configuration store for this session. The VPN media proxy selects two target addresses. The first one belongs to the VPN address space (10.O:o), the second belongs in the external network address space (47.Z:b).

At step 8 the call server advises the UAS of the external 47.Z:b address allocated by the VPN media proxy for this session, and at step 9 this is acknowledged with an indication of the address and port selected by the UAS (47.U:u). At step 9.1, the call server alerts the VPN media proxy of the address selected by UAS, to enable the VPN media proxy to update its context binding. Steps 10 and 11 correspond to those of FIG. 4. In step 12 the originating line gateway starts sending RTP packets toward the address it receive in step 11, corresponding to the VPN media proxy address in the VPN address space. Those RTP packets are forwarded on toward the UAS based on the context binding configured in step 9.1. Similarly, the UAS packet starts sending RTP packets in step 13 toward the VPN media proxy, as instructed in step 8. The VPN media proxy forwards on those RTP packet to the originating line gateway based on the context binding established in steps 7.2 and 7.3.

FIG. 6 Sequence of VoIP Call Setup with Tag to Identify VPN

FIG. 6 shows another sequence chart relating to VoIP call setup. Again, corresponding reference numerals have been used as appropriate. In this case, the VPN media proxy 250 and the VPN gateway 100 are combined together (130). The destination is a stand alone converter exemplified by a trunk gateway 38. The call server tries at step 8 to alert the trunk gateway of the VPN identity. However, the trunk gateway does not recognize this VPN identity and rejects it in step 9. Accordingly, at steps 10 and 11, the call server alerts the media proxy 130 of the VPN identity, requests the media proxy 130 for target addresses, and tries again at step 12 to set up the session with the trunk gateway. This is successful as acknowledged by the reply at step 13 which includes the address port selected by the trunk gateway. At step 14, the call server passes this port on to the media proxy to enable it to update its context binding. Steps 15 to 18 correspond to steps 10 to 13 of FIG. 4, and the call is established.

FIG. 7 Embodiment of Media Proxy with VPN I/Fs Showing Components

FIG. 7 shows an embodiment of a VPN media proxy 405 in the form of a system incorporating various components. The figure also shows surrounding entities including the VPNs, external entities 430 and the call server 44 which are coupled to the VPN media proxy. Illustrated are a blue VPN site 140, a red VPN site 141 and a green VPN site 150. Each site has a router 70, and a voice switch 400 coupled to telephones 25 and to local computers 420. The system includes multiple virtual SDNAT instances 410 to provide source and destination translation of VPN private addresses to or from the external address space. A configuration (config) store 415 is provided for use by the SDNAT instances for storing the parameters controlling the address translations and implement the media proxy function described in FIGS. 4,5 and 6. There is a CP (control processor) 320, which comprises the configuration (config) store 415 for use by the SDNAT instances for storing the parameters controlling the address translations. The CP also comprises the routing logic and routing control for the numerous virtual routers 110 which can be instantiated as desired to route information internally and to/from the various VPNs. One VR is assigned per VPN and exchange routing information with the routing entities within the VPN. This routing information is then used to control the configuration of the forwarding engines FWD 330. The forwarding engines FWD 330 can be implemented on one or multiple separate cards FR (Functional Router) 332. The FRs also provide the physical or logical interface to each of the VPNs, using any of various physical interfaces such as SONET or Ethernet and various logical interfaces such as ATM, Frame Relay, IP. The FWD 330 forwards the data packets from the various VPNs to the FP (Functional Processing) card providing the actual SDNAT and media proxy functions.

The system can be implemented in software using conventional languages running on conventional hardware, with each of the parts implemented on cards coupled by a backplane, following conventional practice.

There can be more than one of the VPN media proxies coupled to each VPN, each of the VPN media proxies being shared by two or more VPNs. Some or each of the systems 405 may have access to the Internet. External entities such as servers can have a variety of purposes. For example they can provide additional value added services to the calls such as video broadcast or streaming servers, voicemail servers or call center services, or announcement servers, a tone generators, or digit collectors for example. The servers can enable the service provider to provide VoIP centrex services. Other external servers can include a SIP (session initiation protocol) proxy, a web server, a storage server, a video server, a mail server, an H.323 gateway, a telephony client, and a telephony media gateway for example.

Concluding Remarks

As has been described above, a VPN media proxy for communication between VPNs and external networks having different addressing schemes, has interfaces to the two or more VPNs, a configuration store, multiple media proxies and address translators arranged to translate the source and destination address of the information based on the configuration. Sharing of the proxy by many VPNs can keep costs down or enable more VPNs to be provided. A call server also shared by the VPNs is used to set up the session and to establish the configuration. The VPN media proxy can have an address within each VPN so that it appears to be a dedicated resource for each VPN. Although the examples illustrated show a communication session in the form of an access to a server, or a VoIP call, clearly other types of communication session can be carried. Other variations will be apparent to those skilled in the art, having corresponding advantages to those set out above, within the scope of the claims.

The invention claimed is:

1. A method for interfacing a virtual private network (VPN) with a network having a different addressing scheme, the method comprising:
at a VPN media proxy having a communications interface for communicating with a first network and a second network, wherein the first network comprises a plurality of interconnected VPNs, the second network is connected to the plurality of interconnected VPNs via the first network, and the second network uses an Internet protocol (IP) addressing scheme different from a private IP network addressing scheme used by one of the plurality of interconnected VPNs:
providing a plurality of virtual routing functions, respective ones of the plurality of virtual routing functions being connected to respective ones of the plurality of interconnected VPNs such that each virtual routing function has an address in a private IP address space of a respective one of the plurality of interconnected VPNs;
translating a destination IP address of a packet in accordance with the IP network addressing scheme of the second network; and
forwarding the packet from a source IP address in the one of the plurality of interconnected VPNs to the destination IP address in the second network.

2. The method of claim 1 further comprising:
translating a second destination IP address of a second packet in accordance with the IP network addressing scheme of the one of the plurality of interconnected VPNs; and
forwarding the second packet from a second source IP address in the second network to the second destination IP address in the one of the plurality of interconnected VPNs.

3. The method of claim 1 wherein address translation is provided for each of the plurality of virtual routing functions.

4. The method of claim 1 wherein the first network is a public network using a public IP network addressing scheme and the second network is a carrier network using a private IP network addressing scheme.

5. The method of claim 1 wherein another of the plurality of interconnected VPNs uses a second private IP network addressing scheme, the second private IP network addressing scheme utilizing an address, the address also being utilized by the private IP network addressing scheme used by the one of the plurality of interconnected VPNs.

6. The method of claim 1 wherein the packet comprises voice over Internet protocol (VoIP) signaling information.

7. The method of claim 1 wherein the packet comprises voice over Internet protocol (VoIP) bearer information.

8. The method of claim 1 wherein the second network interfaces the first network to a switched telephone network (STN) via a trunk gateway, the trunk gateway having the destination IP address.

9. The method of claim 8 wherein the STN is a public STN (PSTN).

10. The method of claim 1 further comprising storing configuration information for a session to be established between an entity in the one of the plurality of interconnected VPNs and an entity in the second network.

11. The method of claim 10 wherein the configuration information comprises source and destination IP addresses for the entity in the one of the plurality of interconnected VPNs and the entity in the second network.

12. The method of claim 10 wherein the session comprises a voice over Internet protocol (VoIP) session.

13. A virtual private network (VPN) media proxy for interfacing a VPN with a network having a different addressing scheme, the VPN media proxy comprising:
a communications interface for communicating with a first network and a second network, wherein the first network comprises a plurality of interconnected VPNs, the second network is connected to the plurality of interconnected VPNs via the first network, and the second network uses an Internet protocol (IP) addressing scheme different from a private IP network addressing scheme used by one of the plurality of interconnected VPNs;
a routing module for providing a plurality of virtual routing functions, respective ones of the plurality of virtual routing functions being connected to respective ones of the plurality of interconnected VPNs such that each virtual routing function has an address in a private IP address space of a respective one of the plurality of interconnected VPNs;
an address translation module for translating a destination IP address of a packet in accordance with the IP network addressing scheme of the second network; and
a communications module for forwarding the packet from a source IP address in the one of the plurality of interconnected VPNs to the destination IP address in the second network.

14. The VPN media proxy of claim 13 wherein the address translation module is configured to translate a second destination IP address of a second packet in accordance with the IP network addressing scheme of the one of the plurality of interconnected VPNs and wherein the communications module is configured to forward the second packet from a second source IP address in the second network to the second destination IP address in the one of the plurality of interconnected VPNs.

15. The VPN media proxy of claim 13 wherein the address translation module is configured to provide address translation for each of the plurality of virtual routing functions.

16. The VPN media proxy of claim 13 wherein the first network is a public network using a public IP network addressing scheme and the second network is a carrier network using a private IP network addressing scheme.

17. The VPN media proxy of claim 13 wherein another of the plurality of interconnected VPNs uses a second private IP network addressing scheme, the second private IP network addressing scheme utilizing an address, the address also being utilized by the private IP network addressing scheme used by the one of the plurality of interconnected VPNs.

18. The VPN media proxy of claim 13 wherein the packet comprises voice over Internet protocol (VoIP) signaling information.

19. The VPN media proxy of claim 13 wherein the packet comprises voice over Internet protocol (VoIP) bearer information.

20. The VPN media proxy of claim 13 wherein the second network interfaces the first network to a switched telephone network (STN) via a trunk gateway, the trunk gateway having the destination IP address.

21. The VPN media proxy of claim 20 wherein the STN is a public STN (PSTN).

22. The VPN media proxy of claim 13 further comprising a configuration store for storing configuration information for a session to be established between an entity in the one of the plurality of interconnected VPNs and an entity in the second network.

23. The VPN media proxy of claim 22 wherein the configuration information comprises source and destination IP addresses for the entity in the one of the plurality of interconnected VPNs and the entity in the second network.

24. The VPN media proxy of claim 22 wherein the session comprises a voice over Internet protocol (VoIP) session.

25. A non-transitory computer readable medium comprising computer executable instructions that when executed by a processor of a computer perform steps comprising:

at a VPN media proxy having a communications interface for communicating with a first network and a second network, wherein the first network comprises a plurality of interconnected VPNs, the second network is connected to the plurality of interconnected VPNs via the first network, and the second network uses an Internet protocol (IP) addressing scheme different from a private IP network addressing scheme used by one of the plurality of interconnected VPNs:

providing a plurality of virtual routing functions, respective ones of the plurality of virtual routing functions being connected to respective ones of the plurality of interconnected VPNs such that each virtual routing function has an address in a private IP address space of a respective one of the plurality of interconnected VPNs;

translating a destination IP address of a packet in accordance with the IP network addressing scheme of the second network; and forwarding the packet from a source IP address in the one of the plurality of interconnected VPNs to the destination IP address in the second network.

\* \* \* \* \*